United States Patent [19]

Minagawa et al.

[11] 4,169,089
[45] Sep. 25, 1979

[54] HYDROXYBENZOPHENONE STABILIZER COMPOSITION

[75] Inventors: Motonobu Minagawa, Koshigaya; Naohiro Kubota, Urawa; Kazuo Sugibuchi, Tokyo, all of Japan

[73] Assignee: Argus Chemical Corporation, Brooklyn, N.Y.

[21] Appl. No.: 892,148

[22] Filed: Mar. 31, 1978

[51] Int. Cl.$^2$ .............................................. C08K 5/13
[52] U.S. Cl. ............................ 260/45.95 F; 252/404; 260/591
[58] Field of Search ....................... 260/45.95 F, 591; 252/404

[56] References Cited

U.S. PATENT DOCUMENTS 3,399,237  8/1968  Dressler et al. ...................... 260/591
3,649,695  3/1972  Millionis ............................. 260/591

FOREIGN PATENT DOCUMENTS 50-74579  6/1975  Japan .

Primary Examiner—Veronica P. Hoke
Attorney, Agent, or Firm—Otto S. Kauder

[57] ABSTRACT

Synthetic resins processed at temperatures in excess of 200° C. are protected against deterioration on exposure to light of wave length shorter than 400 nanometers by compounding with a stabilizer composition comprising (A) 40 to 90 parts by weight of at least one 5,5'-methylenebis(2-hydroxy-4-alkoxybenzophenone) having 1 to 18 carbon atoms in the alkoxy group, (B) 5 to 30 parts by weight of at least one 3,5'-methylenedi(2-hydroxy-4-alkoxybenzophenone) having 1 to 18 carbon atoms in the alkoxy group, (C) 5 to 40 parts by weight of at least one 3,3'-methylenebis(2-hydroxy-4-alkoxybenzophenone) having 1 to 18 carbon atoms in the alkoxy group. Synthetic resins suitably stabilized with compositions of the invention include thermoplastic polyesters such as polyhydric phenol carbonate polyesters and alkanediol terephthalate polyesters, as well as high melting polyolefins such as poly-4-methylpentene and polypropylene.

14 Claims, No Drawings

HYDROXYBENZOPHENONE STABILIZER COMPOSITION

BACKGROUND OF THE INVENTION

This invention relates to 2-hydroxy-4-alkoxybenzophenone ultraviolet radiation absorbing compounds, to a process for preparing such compounds, to synthetic resins stabilized against the harmful effects of ultraviolet radiation by incorporating in such resins small quantities of such compounds, and to stabilizer compositions comprising such compounds.

Certain 2-hydroxy-4-alkoxybenzophenone compounds are known to be effective ultraviolet absorbers and light stabilizers, with the 2-hydroxy group critically necessary for effectiveness. These are among a large number of classes of compounds disclosed in the patent literature as meeting the requirements for an effective ultraviolet radiation absorber. In lieu of individual references, the review by G. R. Lappin in "Encyclopedia of Polymer Science and Technology" (N. Bikales, ed. New York, John Wiley-Interscience, 1971) Vol. 14, pages 125 to 148 can be consulted.

According to Lappin's review, the 18 2-hydroxybenzophenone compounds indicated to be in commercial use as stabilizers are low to moderate molecular weight compounds having a single benzophenone unit in the molecule. Lappin refers to problems of "compatability" of the additive stabilizer with the polymer being stabilized, including such properties as the solubility of the additive in the polymer, the rate of diffusion of the additive through the polymer, and the rate of loss of the additive from the polymer. Lappin characterizes compatibility as "a sensitive function of molecular structure and not entirely predictable." Among attempts to improve the commercially available 2-hydroxybenzophenones, Lappin indicates that longer outdoor life of polymers might be obtained with relatively high molecular weight ultraviolet radiation absorbers and states that attempts to utilize polymeric and polymerizable absorbers for this purpose had given ambiguous results and not been commercially successful.

Subsequent attempts to overcome the inadequacies of the conventional ultraviolet absorber stabilizers include a number of disclosures of 2-hydroxybenzophenones having either a plurality of benzophenone units in the molecule or functional group substitution in addition to hdroxyl and alkoxyl. Thus Lappin in U.S. Pat. No. 3,310,525 of Mar. 21, 1967 disclosed alpha-omega-bis(2-hydroxybenzoyl)alkane stabilizers for polyesters and poly-alpha-olefin resins, having a formula

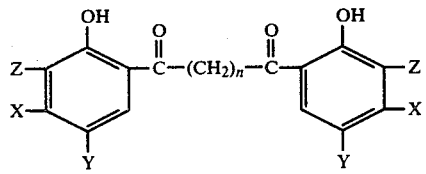

wherein n is an integer in a range from 2 to 8, and X, Y and Z are independently selected from the group of hydrogen, $C_1$–$C_4$alkoxy and $C_1$–$C_4$alkyl radicals.

H. Dressler in U.S. Pat. No. 3,399,237 of Aug. 27, 1968 disclosed ultraviolet light stabilizing derivatives of 4-benzoylresorcinol having the formula

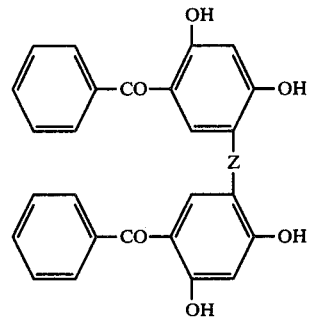

wherein Z is a member selected from the group consisting of sulfur and

and R is a member selected from the group consisting of hydrogen and alkyl having from 1–11 carbon atoms.

M. Minagawa in Japen Kokai No. 74 78,692 of July 29, 1974 disclosed 2-hydroxybenzophenone derivatives carrying cyclic imide substituents linked to the 4-position of the 2-hydroxybenzophenone by an alkyleneoxy group, for example 4-(2-phthalimidethoxy)-2-hydroxybenzophenone.

M. Minagawa in Japan Kokai No. 75 74579 of June 19, 1975 disclosed 2-hydroxybenzophenone derivatives having from 2 to 7 hydroxybenzophenone units linked through such bivalent groups as methylene, methyleneoxymethylene, cyclohexylidene, sulfide, sulfinyl, sulfonyl, alkylidene, carboxyalkylidene, and carbalkoxyalkylidene, including for example methylenebis(2-hydroxy-4-methoxybenzophenone). The location of attachment of the bivalent linking group on the 2-hydroxybenzophenone unit is nowhere specified by Minagawa.

M. Minagawa in Japan Kokai No. 75 86487 of July 11, 1975 disclosed 2-hydroxybenzophenone derivatives substituted in unspecified ring position with N-methylene cyclic amide and N-methylene cyclic imide groups.

SUMMARY OF THE INVENTION

In accordance with this invention, synthetic resins processed at temperatures in excess of 200° C. are protected against deterioration on exposure to light of wave length shorter than 400 nanometers by compounding with a stabilizer composition comprising (A) 40 to 90 parts by weight of at least one 5,5'-methylenebis(2-hydroxy-4-alkoxybenzophenone) having 1 to 18 carbon atoms in the alkoxy group, (B) 5 to 30 parts by weight of at least one 3,5'-methylenedi(2-hydroxy-4-alkoxybenzophenone), having 1 to 18 carbon atoms in the alkoxy group, and (C) 5 to 40 parts by weight of at least one 3,3'-methylenebis(2-hydroxy-4-alkoxybenzophenone) having 1 to 18 carbon atoms in the alkoxy group. Quite modest amounts of stabilizer composition are sufficient, ranging from 0.001 to 10 parts by weight, preferably 0.05 to 5 parts by weight, for 100 parts of synthetic resin being stabilized. Preferably the 5,5'-methylenebis(2-hydroxy-4-alkoxybenzophenone), the 3,5'-methylenedi(2-hydroxy-4-alkoxybenzophenone), and the 3,3'-methylenebis(2-hydroxy-4-alkoxybenzophenone) components of the stabilizer composition all have the same alkoxy group and are position isomers of one another. Synthetic resins that are processed hotter than 200° C. and are particularly well stabilized with the stabilizer composition of this invention include thermoplastic polyesters such as polyhydric phenol e.g., 4,4'-isopropylidenediphenyl) carbonate polyesters and 2 to 4 carbon atom alkanediol terephthalate polyesters, and high melting alpha olefin polymers such as poly-4-methylpentene and polypropylene.

DESCRIPTION OF THE PREFERRED EMBODIMENTS

The methylenebis(2-hydroxy-4-alkoxybenzophenone) compounds used in the stabilizer compositions can be represented by formulae A(5,5'-methylene structure), B(3,5'-methylene structure), and C(3,3'-methylene structure), as follows:

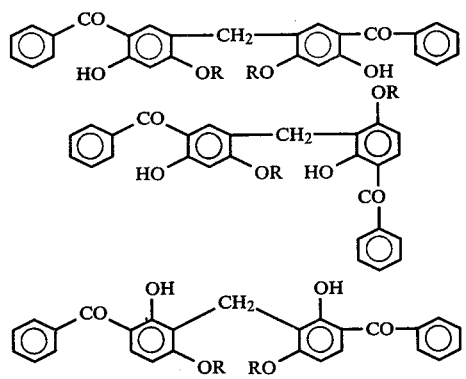

In each formula, R is an alkyl group having 1 to 18 carbon atoms, for example methyl, ethyl, isopropyl, n-propyl, n-butyl, isobutyl s-butyl, isoamyl, n-hexyl, 2-ethylbutyl, n-heptyl, n-octyl, 2-ethylhexyl, isooctyl, n-nonyl, 3,5,5-trimethylhexyl, n-decyl, isodecyl, n-dodecyl, mixed primary $C_{12}$–$C_{15}$ alkyl,, isotridecyl, n-tetradecyl, n-hexadecyl, 2-butyloctyl, 2-hexyldecyl, and n-octadecyl.

In the polymer stabilization Examples that follow, stabilizer compositions containing each of formula A, formula B, and formula C, methylenebisbenzophenones are compared to individual methylenebisbenzophenones and compositions containing only two of the three type structures. The following methylenebisbenzophenones are included:

$A_1$: 5,5'-methylenebis(2-hydroxy-4methoxybenzophenone)

$B_1$: 3,5'-methylenedi(2-hydroxy-4-methoxybenzophenone)

$C_1$: 3,3'-methylenebis(2-hydroxy-4-methoxybenzophenone)

$A_8$: 5,5'-methylenebis(2-hydroxy-4-octoxybenzophenone)

$B_8$: 3,5'-methylenedi(2-hydroxy-4-octoxybenzophenone)

$C_8$: 3,3'-methylenebis(2-hydroxy-4-octoxybenzophenone)

$A_{12}$: 5,5'-methylenebis(2-hydroxy-4-lauroxybenzophenone $B_{12}$: 3,5'-methylenedi(2-hydroxy-4-lauroxybenzophenone)

$C_{12}$: 3,3'-methylenebis(2-hydroxy-4-lauroxybenzophenone)

SYNTHETIC EXAMPLE 1

Preparation of compound $A_1$ 5,5'-methylenebis(2-hydroxy-4-methoxybenzophenone) by catalytic dimerization 28.6 g of 5-dimethylaminomethyl-2-hydroxy-4-methoxybenzophenone, 40 ml of Pegasol 3040 (aliphatic hydrocarbon, b.p. 155° to 204° C., Mobil Chemical Co.) and 10 ml of 2-ethylhexanol was put into a flask, dissolved, added 0.5 gr of sodium methoxide and heated at 120° to 125° C. under stirring for 15 hours. After cooling, 50 ml of acetone was added and filtered. The obtained crystal was dispersed in 80 ml of water containing 0.5% acetic acid and treated at 80° C. for 3 hours.

17.5 g (yield: 74.8% of 5,5'-methylenebis(2-hydroxy-4-methoxybenzophenone yellow crystalline fine as a powder with melting point of 229°to 230° C. was obtained after filtration and drying. The NMR spectrum provided evidence that the methylene group was attached to the 5 and 5' positions of the two 2-hydroxybenzophenone groups.

SYNTHETIC EXAMPLE 2

Preparation of compound $B_1$ 3,5'-methylenedi-(2-hydroxy-4-methoxybenzophenone). 45.6 g of 2-hydroxy-4-methoxybenzphenone, 3.3 g of trioxane, 0.5 g of toluenesulfonic acid and 50 g of aromatic solvent (Solvesso 150; Esso) were stirred at 90°–100° C. for 9 hours. After cooling, the reaction mixture was filtered. The obtained crude material contained 3,5'-isomer, 5,5'-isomer and a polycondensed impurity.

The crude material was extracted with three portions of 150 ml of hot acetone. The acetone was evaporated and the resulting yellow crystalline material was recrystallized from methanol. It had M.P. 197°–203° C. and NMR spectrum consistent with the 3,5'-linked structure.

SYNTHETIC EXAMPLE 3

Preparation of compound $C_1$ 3,3'-methylenebis(2-hydroxy-4-methoxybenzophenone) 42.8 g of 2,4-di-hydroxybenzophenone, 3.6 g of paraform-aldehyde and 100 ml of cyclohexanol were stirred for 9 hours under reflux. After cooling, 100 ml of acetone was added and stirred at 50° C. for 30 min. The precipitate was filtered and washed with acetone.

The precipitate was dispersed in 200 ml of water and stirred at 80° C. for 1 hour and then filtered at 80° C. 3,3'-methylenebis-2,4-dihydroxybenzophenone was obtained having M.P. 287°–289° C. 18.5 g of methyliodide was added dropwise to the mixture of 22 g of 3,3'-methylenebis(2,4-dihydroxybenzophenone), 18 g of potassium carbonate and 100 ml of acetone. Then the whole was stirred for 10 hours under reflux. The product was filtered and washed with water and the resulting 3,3'-methylenebis(2-hydroxy-4-methoxybenzophenone) was crystallized from toluene. It had m.p. 209°–212° C. and NMR spectrum consistent with the 3,3'-linked structure.

Synthetic resins that can be stabilized with a stabilizer comprising a 5,5'-methylenebis(2-hydroxy)-4-alkoxybenzophenone), and a 3,5'-methylenedi(2-hydroxy)-4-alkoxybenzophenone) and a 3,3'-methylenebis(2-hydroxy-4-alkoxybenzophenone) according to this invention include alphaolefin polymers such as polyethylene, polypropylene, polybutene, poly-3-methylbutene, or copolymers thereof such as ethylene-vinylacetate copolymer, ethylenepropylene copolymer, polystyrene, polyvinylacetate, acrylic ester resins, copolymers from styrene and another monomer (for example, maleic anhydride, butadiene, acrylonitrile and so on), acrylonitrile-butadiene-styrene copolymer, acrylic acid ester-butadienestyrene copolymer, methacrylic acid ester-butadiene-styrene copolymer, methacrylate ester resin such as polymethylmethacrylate, polyvinylalcohol, ethylene and butylene terephthalate polyesters, polyamide, polycarbonate, polyacetal, polyurethane, cellulosic resin, or phenolic resin, urea resin, malamine resin, epoxy resin, unsaturated polyester, silicone resin, halogen-containing resins such as polyvinyl chloride, polyvinylidene chloride, polyvinylidene fluoride and copolymers thereof, and further rubbers such as isoprene rubber chloroprene rubber, and blends of the above resins. Outstanding results are obtained in polymers processed above 200° C., such as the high melting olefin polymers including polypropylene and poly-4-methylpentene, polycarbonate esters of alkylidenebisphenols, and alkanediol terephthalate polyesters. Stabilizer compositions according to this invention can be formulated and marketed in liquid, solid, and paste forms. An inert solvent can be used to facilitate handling. The methyelenebis(2-hydroxy-4-alkoxybenzophenone) components of the stabilizer composition can also be solubilized in one another by heating, such as at 70°–160° C. up to 4 hours, and then allowing the resulting melt to cool and harden sufficiently to be flaked and ground.

Known polymer stabilizers can be used in synthetic resin compositions together with the stabilizer compositions of this invention and can be admixed with the latter. Such known stabilizers include phenols, thiodipropionic acid esters, polyvalent metal salts of carboxylic acids, organic phosphites, and 1,2-epoxides.

As examples of the phenols suited for use in this invention, one may cite the following: 2,6-di-tertiarybutyl-p-cresol, stearyl-(3,5-di-methyl-4-hydroxybenzyl)-thioglycolate, stearyl-beta(4-hydroxy-3,5-di-tertiary butylphenyl) propionate, distearyl-(4-hydroxy-3-methyl-5-tertiary butyl) benzylmalonate, 2,2'-methylenebis(4-methyl-6-tertiary butylphenol), 4,4'-methylenebis(2,6-di-tertiary butylphenol), 2,2'-methylene bis(6-(1-methylcyclohexyl)-p-cresol), bis (3,3-bis(4-hydroxy-3-tertiary butylphenyl) butyric acid) glycol ester, 4,4'-butylidenebis(6-tertiary butyl-m-cresol), 1,1,3-tris(2-methyl-4-hydroxy-5-tertiary butylphenyl)-butane, 1,3,5-tris(3,5-di-tertiary butyl-4-hydroxyphenyl)-2,4,6-trimethylbenzene, tetrakis(methylene-3-(3,5-di-tertiary butyl-4-hydroxyphenyl) propionate) methane, 1,3,5-tris(3,5-di-tertiary butyl-4-hydroxybenzyl-(isocyanurate, 1,3,5-tris(3,5-di-tertiary butyl)-4-hydroxyphenyl)propionyloxyethyl) isocyanurate, 2-octylthio4,6-di(4-hydroxy-3,5di-tertiarybutyl)phenoxy-1,3,5-triazine, and, 4,4'-thiobis(6-tertiary butyl-m-cresol).

A comprehensive disclosure of useful phenols by M. Minagawa et al. in U.S. Pat. No. 3,907,517 column 17 line 64 to column 23 line 61 is here incorporated by reference. When phenols are used, the concentration per 100 parts of polyolefin resin can range from 0.01 to about 0.5 part by weight.

Representative thiodipropionic acid esters include di-n-dodecyl thiodipropionate, dihexadecyl thiodipropionate, distearyl thiodipropionate, n-octyl eicosanyl thiodipropionate and n-octadecyl cyclohexane-1,4-dimethanol thiodipropionate polyester. A comprehensive disclosure of useful thiodipropionate esters by M. Minagawa et al. in U.S. Pat. No. 3,869,423, column 17 line 55 to column 19 line 54 is here incorporated by reference.

Representative polyvalent metal salts include zinc, calcium, magnesium, barium, strontium and nickel salts of monocarboxylic acids having 6 to 24 carbon atoms, for example zinc benzoate, calcium palmitate, and nickel 2-ethylbutyrate. A comprehensive disclosure of useful metal salts by M. Minagawa et al. in U.S. Pat. No. 3,869,423, column 19 line 56 to column 20 line 35 is here incorporated by reference.

Representative organic phosphites include triisodecylphosphite, tris (nonylphenyl phosphite), and 4,4'-isopropylidene diphenol $C_{12}$–$C_{15}$ mixed alkyl phosphite. A comprehensive disclosure of useful organic phosphites by M. Minagawa et al. in U.S. Pat. No. 3,849,370 Column 13 line 63 to column 16 line 48 is here incorporated by reference. Representative 1,2-epoxides include epoxysoybean oil, epoxylinseed oil, and ethylhexyl epoxystearate. A comprehensive disclosure of 1,2-epoxides by M. Minagawa et al. in U.S. Pat. No. 3,869,423 column 26 line 13 to line 39 is here incorporated by reference.

The preparation of the stabilized resin composition is easily accomplished by conventional procedures. A heated two roll mill, for example, is a convenient compounding tool for blending stabilizer compositions of the invention with polyolefins, vinyl chloride polymers, ABS polymers, ethylene-vinyl acetate copolymers and others. Where higher temperature mixing is needed, hot oil or electrically heated Banbury mixers or instruments like the Brabender plastograph torque-recording mixer can be used.

The following Examples illustrate the use of polymer stabilizer compositions of the invention.

EXAMPLE 1

The effectiveness in protecting the good mechanical properties of polycarbonate resin of stabilizer compositions according to this invention, individual components of the stabilizer composition used alone or in pairs, and certain well-known commercial hydroxybenzophenone ultraviolet stabilizers are compared.

| Polycarbonate resin | 100 parts by wt. |
|---|---|
| Stabilizer | As shown in Table 1 |

The composition was thoroughly blended in a Brabender Plastograph, and then compression-molded at 300° C. to form sheets 1 mm thick.

Pieces 2.5 cm square were cut off from the sheets and exposed to ultraviolet light in a Weather-O-Meter for 1,000 hours. Elongation before and after 1,000 hours exposure was determined, and the percent of retention of elongation is shown in Table 1.

TABLE 1

| No. | Stabilizer | Quantity (Parts by wt.) | % Elongation Retention |
|---|---|---|---|
| Control | | | |
| 1-1 | None | — | 30 |
| 1-2 | 2-hydroxy-4-methoxybenzophenone | 0.2 | 42 |
| 1-3 | 2-hydroxy-4-octoxy benzophenone | 0.2 | 40 |
| 1-4 | 2-hydroxy-4-lauroxy benzophenone | 0.2 | 40 |

TABLE 1-continued

| No. | Stabilizer | Quantity (Parts by wt.) | % Elongation Retention |
|---|---|---|---|
| 1-5 | $A_1$ | 0.2 | 43 |
| 1-6 | $A_8$ | 0.2 | 44 |
| 1-7 | $A_{12}$ | 0.2 | 41 |
| 1-8 | $A_1$ | 0.1 | |
|  | $C_1$ | 0.1 | 52 |
| 1-9 | $A_1$ | 0.1 | |
|  | $B_1$ | 0.1 | 50 |
| EXAMPLE 1-1 | $A_1$ | 0.16 | |
|  | $B_1$ | 0.02 | 86 |
|  | $C_1$ | 0.02 | |
| 1-2 | $A_1$ | 0.16 | |
|  | $B_1$ | 0.01 | 88 |
|  | $C_1$ | 0.03 | |
| 1-3 | $A_8$ | 0.1 | |
|  | $B_8$ | 0.05 | 80 |
|  | $C_8$ | 0.05 | |
| 1-4 | $A_{12}$ | 0.1 | |
|  | $B_{12}$ | 0.05 | 84 |
|  | $C_{12}$ | 0.05 | |

Each sample stabilized according to this invention with a composition containing a 5,5'-methylenebis(2-hydroxy-4-alkoxybenzophenone) of formula A, a 3,5'-methylenedi(2-hydroxy-4-alkoxybenzophenone) of formula B, and a 3,3'-methylenebis(2-hydroxy-4-alkoxybenzophenone) of formula C provided approximately twice the retention of elongation of good commercial hydroxybenzophenone ultraviolet stabilizers under the same conditions, and considerably better retention than individual methylenebisbenzophenones or pairs of methylenebisbenzophenones used in the same total amount.

EXAMPLE 2

The effectiveness of stabilizer compositions of this invention was compared to that of individual methylenebisbenzophenones and control ultraviolet stabilizers in polypropylene.

| | |
|---|---|
| Polypropylene | 100 parts by weight |
| Dilaurylthiodipropionate | 0.3 |
| 1,3,5-Tris(3,5-di-t-butyl-4-hydroxybenzyl)isocyanurate | 0.1 |
| Stabilizer | As shown in Table 2 |

The composition was thoroughly blended in a Brabender Plastograph, and then compression-molded to form sheets 0.5 mm thick. Pieces 2.5 cm square were cut off from the sheets. The light resistance of these pieces was then determined by placing the pieces in a Weather-O-Meter, and exposing them to ultraviolet light.

The time in hours was then noted, and reported in Table 2 as hours to failure for the sheet to develop a noticeable discoloration and/or embrittlement, indicating deterioration due to oxidation in the presence of ultraviolet light.

Table 2

| No. | Stabilizer | Quantity (parts by wt.) | Hours to Failure |
|---|---|---|---|
| Control 2-1 | 2-hydroxy-4-methoxy benzophenone | 0.1 | 870 |
| 2-2 | 2-hydroxy-4-octoxy benzophenone | 0.1 | 630 |
| 2-3 | 5,5'-methylenebis (2,4-dihydroxy benzophenone) | 0.1 | 600 |
| 2-4 | $A_1$ | 0.1 | 700 |
| 2-5 | $A_8$ | 0.1 | 750 |
| 2-6 | $A_{12}$ | 0.1 | 730 |
| EXAMPLE 2-1 | $A_1$ | 0.075 | |
|  | $B_1$ | 0.015 | 2070 |
|  | $C_1$ | 0.010 | |
| 2-2 | $A_1$ | 0.080 | |
|  | $B_1$ | 0.015 | 2130 |
|  | $C_1$ | 0.005 | |
| 2-3 | $A_8$ | 0.08 | |
|  | $B_8$ | 0.01 | 1980 |
|  | $C_8$ | 0.01 | |
| 2-4 | $A_{12}$ | 0.07 | |
|  | $B_{12}$ | 0.02 | 2040 |
|  | $C_{12}$ | 0.01 | |

In comparison to the effectiveness of known hydroxybenzophenone stabilizers and individual methylenebisbenzophenones, the effectiveness of the compositions of this invention in providing more than twice the useful life of the best control composition is outstanding and truly remarkable.

EXAMPLE 3

The effectiveness in protecting the good mechanical properties of polyethylene terephthalate of stabilizer compositions according to this invention, individual components of the stabilizer composition used alone or in pairs, and a well-known commercial hydroxybenzophenone ultraviolet stabilizer was compared.

| | |
|---|---|
| Polyethyleneterephthalate | 100 parts by wt. |
| Stabilizer | As shown in Table 3 |

The composition was thoroughly blended in a dry-blender, and then melt extruded at 250° C. on a casting drum kept at 40° C., to form sheets 1 mm thick. Pieces 2.5 cm square were cut off from the sheets and exposed to ultraviolet light in a Weather-O-Meter for 500 hours. At the start and at the conclusion of the test, the tensile strength of the sheet samples was determined.

The results are given in Table 3 as % retention of the initially determined tensile strength:

TABLE 3

| No. | Stabilizer | Quantity (parts by wt.) | % Retention of Tensile Strength |
|---|---|---|---|
| Control 3-1 | 2-hydroxy-4-methoxy benzophenone | 0.1 | 48 |
| 3-2 | $A_1$ (14) | 0.1 | 51 |
| 3-3 | $A_1$ | 0.05 | |
|  | $B_1$ | 0.05 | 54 |
| 3-4 | $A_1$ | 0.05 | |
|  | $C_1$ | 0.05 | 54 |
| 3-5 | $A_8$ | 0.1 | 52 |
| 3-6 | $A_8$ | 0.07 | |
|  | $C_8$ | 0.03 | 55 |
| Example 3-1 | $A_1$ | 0.07 | |
|  | $B_1$ | 0.01 | 88 |
|  | $C_1$ | 0.02 | |
| 3-2 | $A_1$ | 0.08 | |
|  | $B_1$ | 0.01 | 86 |
|  | $C_1$ | 0.01 | |

TABLE 3-continued

| No. | Stabilizer | Quantity (parts by wt.) | % Retention of Tensile Strength |
|---|---|---|---|
| 3-3 | $A_1$ | 0.075 | |
|  | $B_1$ | 0.010 | 90 |
|  | $C_1$ | 0.015 | |
| 3-4 | $A_8$ | 0.07 | |
|  | $B_8$ | 0.01 | 86 |
|  | $C_8$ | 0.02 | |
| 3-5 | $A_{12}$ | 0.08 | |
|  | $B_{12}$ | 0.01 | 86 |
|  | $C_{12}$ | 0.02 | |

The nearly complete (i.e., seven-eights or better of the original) retention of tensile strength by polyethylene terephthalate samples containing stabilizer compositions of this invention contrasts favorably and unexpectedly with the modest results obtained with samples containing a conventional ultraviolet stabilizers or individual methylenebishydroxybenzophenone compounds used singly or in pairs in the same total amount.

We claim:

1. A stabilizer composition for enhancing the resistance to deterioration of a synthetic resin processed at a temperature in excess of 200° C. on exposure to light of wave length shorter than 400 nanometer, comprising (A) 40 to 90 parts by weight of at least one 5,5'-methylenebis(2-hydroxy-4-alkoxybenzophenone) having 1 to 18 carbon atoms in the alkoxy group, (B) 5 to 30 parts by weight of at least one 3,5'-methylenedi(2-hydroxy-4-alkoxybenzophenone) having 1 to 18 carbon atoms in the alkoxy group, and (C) and 5 to 40 parts by weight of at least one 3,3'-methylenebis(2-hydroxy-4-alkoxybenzophenone) having 1 to 18 carbon atoms in the alkoxy group.

2. A stabilizer composition according to claim 1 in which the 5,5'-methylenebis(2-hydroxy-4-alkoxybenzophenone), the 3,5'-methylenedi(2-hydroxy-4-alkoxybenzophenone), and the 3,3'-methylenebis(2-hydroxy-4-alkoxybenzophenone) have identical alkoxy groups.

3. A stabilizer composition according to claim 1 in which the 5,5'-methylenebis(2-hydroxy-4-alkoxybenzophenone) is 5,5'-methylenebis(2-hydroxy-4-methoxybenzophenone).

4. A stabilizer composition according to claim 1 in which the 5,5'-methylenebis(2-hydroxy-4-alkoxybenzophenone) is 5,5'-methylenebis(2-hydroxy-4-octoxybenzophenone).

5. A stabilizer composition according to claim 1 in which the 5,5'-methylenebis(2-hydroxy-4-alkoxybenzophenone) is 5,5'-methylenebis(2-hydroxy-4-lauroxybenzophenone).

6. A stabilizer composition according to claim 1 comprising as an additional ingredient at least one polymer stabilizer selected from the group consisting of calcium, magnesium, nickel, stannous, strontium, and zinc salts of non-nitrogenous monocarboxylic acids having 6 to 24 carbon atoms, organic phosphites, phenols, and thiodipropionic acid esters.

7. A stabilizer composition according to claim 6 in which the added stabilizer is a calcium salt.

8. A stabilizer composition according to claim 6 in which the added stabilizer is a zinc salt.

9. A stabilizer composition according to claim 6 in which the added stabilizer is a phenol.

10. A stabilizer composition according to claim 6 in which the added stabilizer is a thiodipropionic acid ester.

11. A synthetic resin composition having enhanced resistance to deterioration on exposure to light of wave length shorter than 400 nanometers, comprising a synthetic resin processed at a temperature in excess of 200° C. and 0.001 to 10 parts by weight per 100 parts of synthetic resin of a stabilizer composition according to claim 1.

12. A synthetic resin composition according to claim 11 in which the synthetic resin is a polymer of an alpha-olefin having 3 to 6 carbon atoms.

13. A synthetic resin composition according to claim 11 in which the synthetic resin is a thermoplastic polyhydric phenol carbonate polyester.

14. A synthetic resin composition according to claim 11 in which the synthetic resin is a thermoplastic 2 to 4 carbon atom alkanediol terephthalate polyester.

* * * * *